A. IRVING & P. S. RITHERDON.
FOLDING SIDE CAR ATTACHMENT FOR MOTOR CYCLES.
APPLICATION FILED JAN. 2, 1914.

1,099,851.

Patented June 9, 1914.
5 SHEETS—SHEET 1.

A. IRVING & P. S. RITHERDON.
FOLDING SIDE CAR ATTACHMENT FOR MOTOR CYCLES.
APPLICATION FILED JAN. 2, 1914.

1,099,851.

Patented June 9, 1914.
5 SHEETS—SHEET 4.

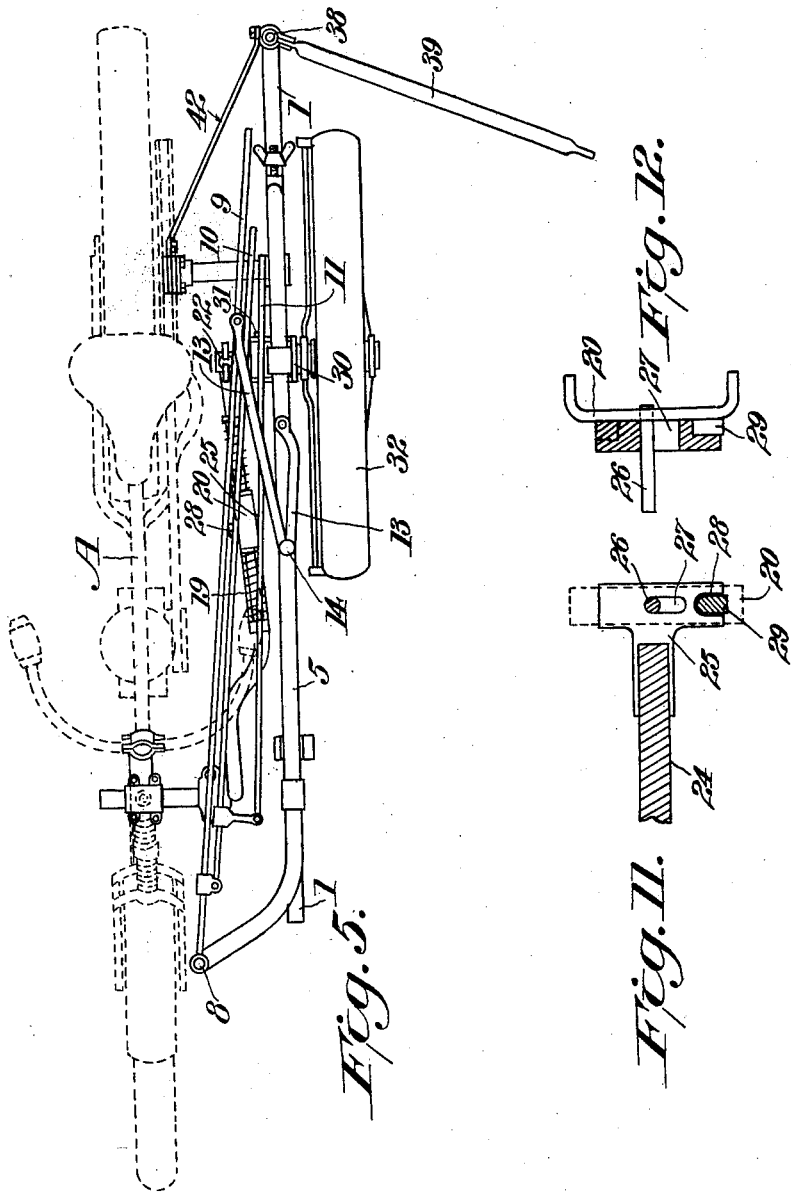

UNITED STATES PATENT OFFICE.

ALFRED IRVING AND PERCY STOCKWELL RITHERDON, OF BOLTON, ENGLAND.

FOLDING SIDE-CAR ATTACHMENT FOR MOTOR-CYCLES.

1,099,851.  Specification of Letters Patent. Patented June 9, 1914.

Application filed January 2, 1914. Serial No. 809,974.

*To all whom it may concern:*

Be it known that we, ALFRED IRVING and PERCY STOCKWELL RITHERDON, subjects of the King of Great Britain, residing, respectively, at 40 Musgrave road, Bolton, in the county of Lancaster, England, and 23 Ivy road, Bolton aforesaid, have invented a certain new and useful Improvement in or Relating to Folding Side-Car Attachments for Motor-Cycles, of which the following description, together with the accompanying sheets of drawings, is a specification.

Our invention relates to improvements in side car attachments for motor cycles of the type in which the framework or chassis of the side car and its supporting wheel are capable of being folded against or in proximity to the framework of the cycle so as to lie somewhat parallel thereto, in order that said cycle and side car may not occupy the same width or space when in their folded positions as when said side car is in its useful or operating position. Many different forms of foldable side car attachments have been heretofore employed and our present invention consists in making use of a side car attachment having a seat mounted thereon, the latter of which is capable of being folded so as to lie close upon the framework or chassis without the removal of any parts, by which means the framework or folding seat may be folded closely into proximity to or against the motor cycle. We also employ a collapsible hood which may also be folded together with said seat so as to lie closely upon the framework or chassis, by which means said hood may be folded together with the chassis and seat against the motor cycle without causing the folding parts to occupy any additional width. The wheel for supporting the folding attachments is also capable of being folded to lie approximately parallel with the framework or chassis when in its folded position, while additional struts or stays are employed which hold the chassis firmly when in its open position, spring actuated bolts and other parts being employed for locking these several parts in position, these bolts or the like being so arranged that they do not require at any time to be removed or detached from the machine.

Figure 1:
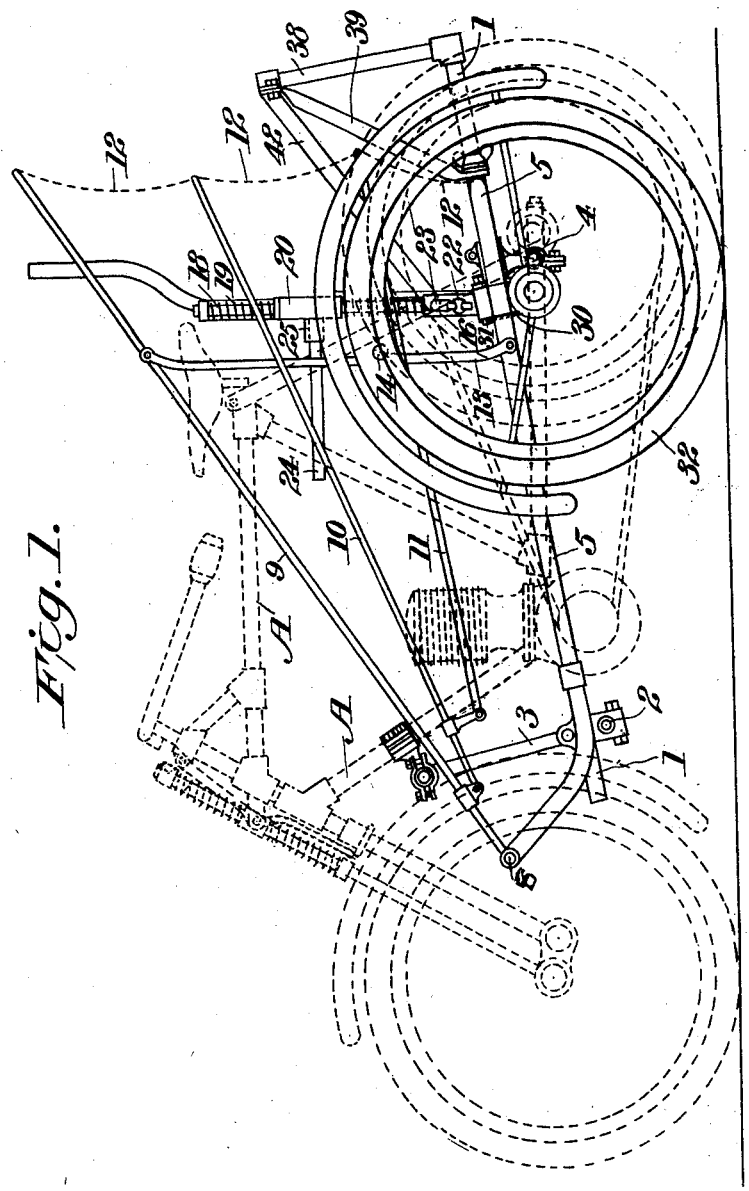
Figure 2:
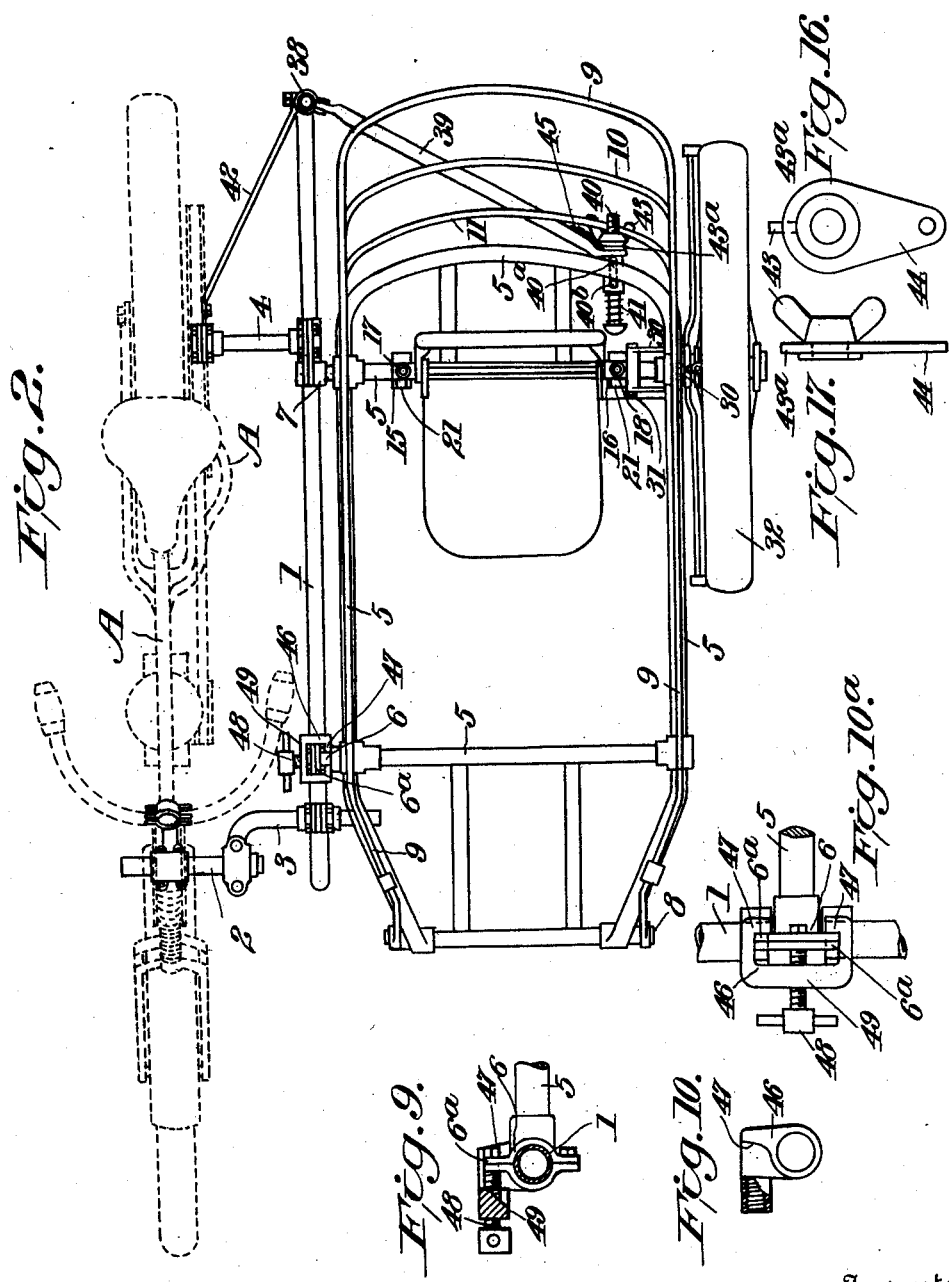
Figure 3:
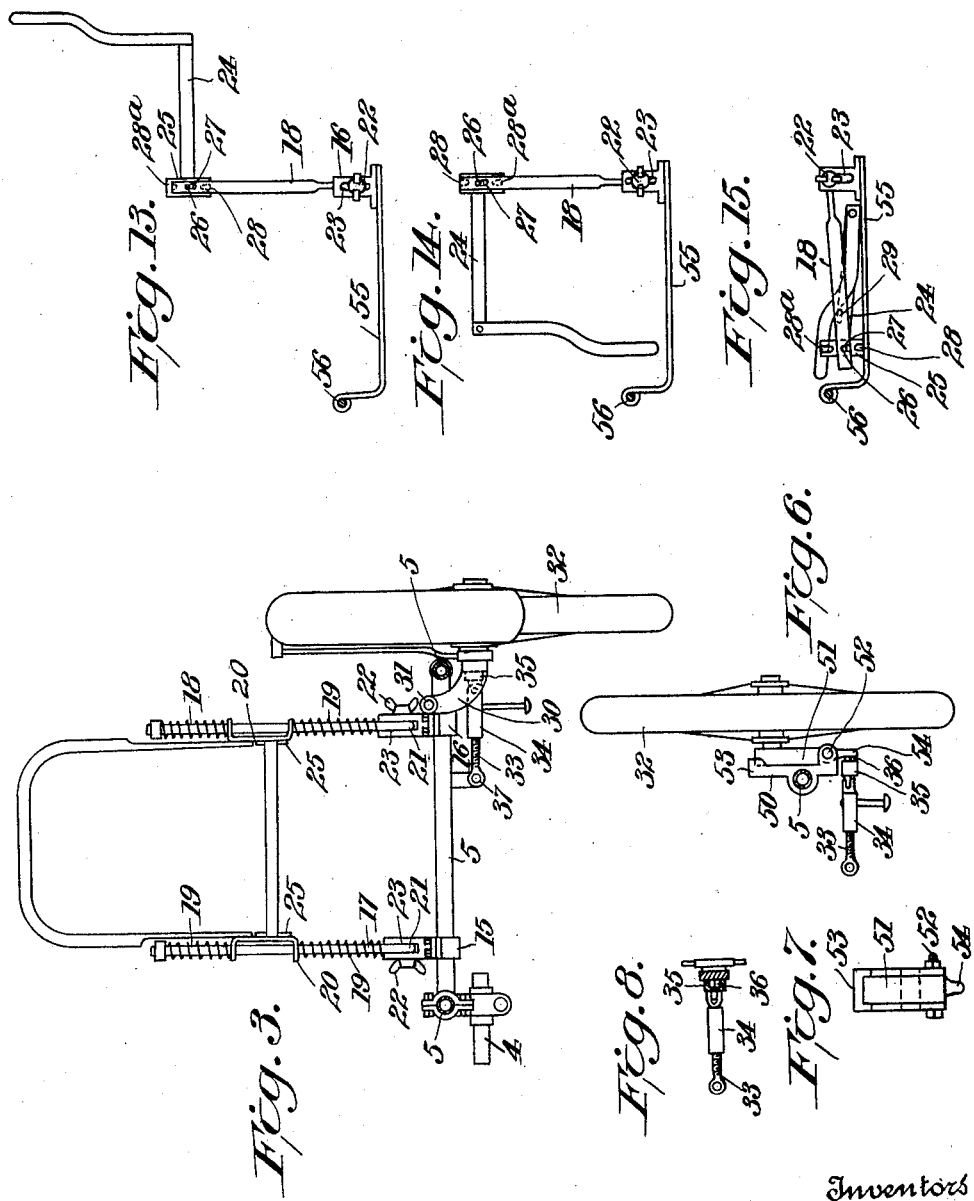
Figure 4:
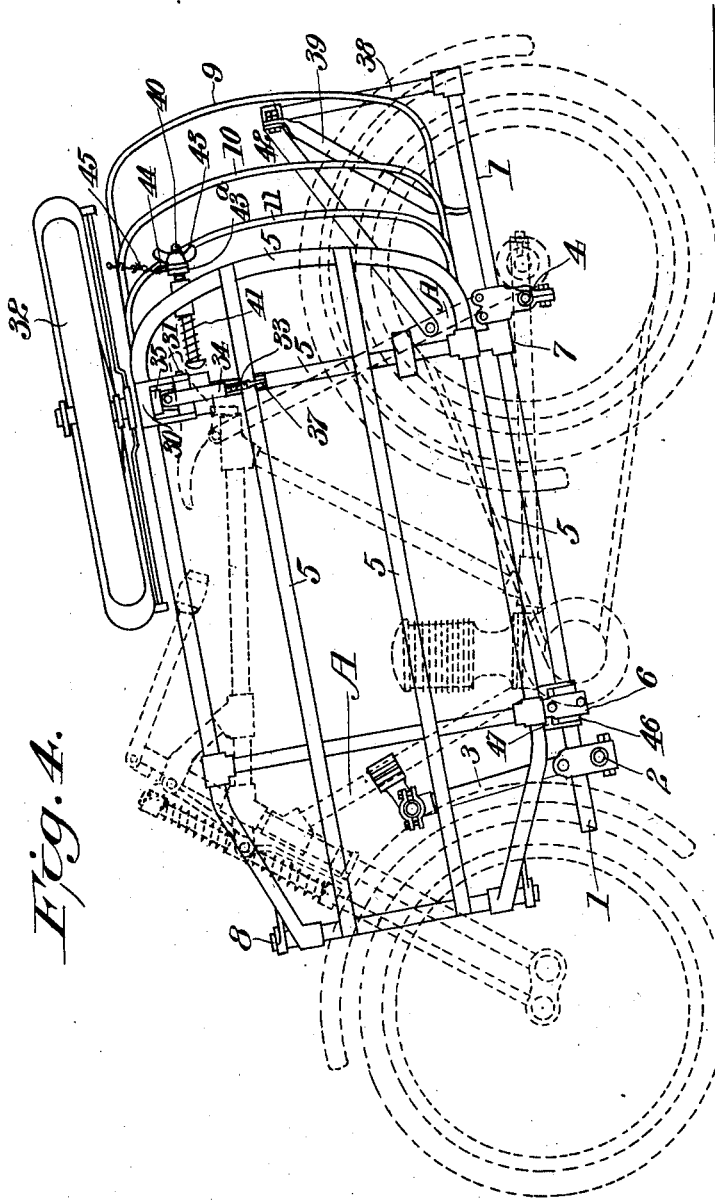

In the accompanying sheets of drawings, which are illustrative of our invention:— Figure 1 is a side elevation of a motor bicycle having a side car attached thereto constructed in accordance with our invention, said motor bicycle being shown in dotted lines for the purpose of distinguishing our improved parts therefrom. Fig. 2 is a plan of parts shown by Fig. 1. Fig. 3 is a front elevation of the side car when in the position indicated by Figs. 1 and 2. Fig. 4 is a side elevation of said motor bicycle with our improved side car folded against same. Fig. 5 is a plan of parts shown by Fig. 4. Fig. 6 is a similar view to a portion of Fig. 3 but illustrates a modified form of hinging or mounting the folding wheel of the side car. Fig. 7 is a side elevation of the support for the wheel shown by Fig. 6. Fig. 8 is a part sectional elevation showing the bolt for holding said wheel rigidly in position when the side car is in its unfolded position. Figs. 9, 10 and 10$^a$ are detail drawings of one of the jointing parts hereinafter described. Fig. 11 is a side sectional elevation of the device for mounting or supporting the folding seat. Fig. 12 is a part sectional elevation of said bearing or support. Fig. 13 is a side elevation of an alternative form of folding seat. Fig. 14 is also a side elevation of said seat with certain of the parts in different relative positions. Fig. 15 is a side elevation of said seat when folded so as to occupy little useful space. Figs. 16 and 17 are detail drawings of parts hereinafter described.

Similar letters and figures of reference indicate like parts throughout the several views.

In carrying our invention into effect we make use of an appropriate stay or rod 1 which is held rigidly upon the framework A of the motor bicycle by appropriate stays or tubes as those marked 2, 3, 4, and by suitable clips for connecting one part to another. Upon this stay 1 we hinge the framework 5 of the side car by means of the hinges 6, 7, said hinge 6 being hereinafter explained in detail. Upon said framework 5 we hinge at 8 a frame 9 which also carries the hinged frames 10, 11. Between these frames 9, 10, 11 and the framework 5 we conncet or stretch leather or other appropriate material 12, so as to form a hood for said side car the material 12 being shown in dotted lines for the sake of clearness. Said frames 9, 10, 11 are held in appropriate positions by means of the stay 13, which is hinged at 14 so that it may be folded as illustrated by Fig. 5.

In bearings 15, 16 we loosely mount rods 17, 18, which have springs 19 taking over them as shown by Fig. 1, an intermediate part 20 being fixed upon each of said uprights 17, 18. The bearings 15, 16 are provided with slots 21 through which said uprights 17, 18 may take when these parts are folded into the position shown by Fig. 5 winged nuts or the like 22 being screwed into said uprights 17, 18, through slots 23 in order to limit the upward movement of the upright parts 17, 18 when it is desired to fold this part down upon the body of the side car, while should it be desired to remove said upright parts 17, 18, and the seat 24 carried thereby, said winged bolts 22 may be unscrewed sufficiently for them to be clear of said uprights 17, 18 (a collar or the like being arranged to prevent them from being withdrawn entirely from the slots 23) so that the whole of the parts carried by said uprights may be removed, this being required should a traveler's sample case or the like be desired to be substituted for the said seat 24. The seat 24 has fixed upon it brackets 25 which slide upon or over the parts 20. These parts 20 carry a rod 26 over which may slide the parts 25 by means of the slots 27, while the brackets 25 have formed in them notches 28 which take over projecting parts 29 fixed upon or formed integrally with the parts 20, by which means the brackets 25 may be raised or moved over the parts 20 for a sufficient space for the notches 28 to be clear of the projections 29 (this being allowed by having the slots 27 of sufficient length) when the seat 24 may then be folded down against the uprights 17, 18 somewhat as shown by Fig. 15.

In bearings 30 which are hinged at 31 we mount the wheel 32 of the side car. This wheel is held in its normal position or when in contact with the ground by means of a bolt 33 over which takes a sleeve 34 said sleeve carrying at its outer end a nut 35 to which it is connected by a shackle or other part which will allow said sleeve to rotate without rotating the nut 35. This nut is hollow and takes over a hexagonal or other appropriate projecting part 36 formed upon the bearing 30 of the wheel 32. The bolt 33 is connected at 37 to a part of the framework 5 of the side car so that it is thereby firmly held when the wheel 32 is in its ordinary or normal position shown by Fig. 1, while when the nut 35 is moved away from the projecting part 36 said wheel 32 may be folded into the position illustrated by Fig. 5. In Fig. 4 the framework 5 and other parts of the side car are shown folded against the framework of the motor bicycle but the wheel 32 is illustrated in the position it occupies previously to being released and folded into the position shown by Fig. 5.

A tube or bracket 38 extends from the stay 1 and carries another tube or stay 39 which is connected to the framework 5 by means of a bolt 40 controlled by a spring 41 while also connected to said tube 38 is another stay 42 fixed upon the rear framework of the motor bicycle. The winged nut 43 for the bolt 40 is provided with a collar 43$^a$ and with an extension 44 to which is connected a chain 45 carried by the stay 39, so that as said winged nut is unscrewed entirely clear of the bolt 40 it will be held by said chain 45 and so will not become detached from the machine and lost. The bolt 40 is provided with a collar or pin and slot device 40$^a$, 40$^b$ in order that it may not be entirely dislodged from its supporting part by its spring 41 when said winged nut 43 is unscrewed as above described.

The form of hinge for the framework 5 consists of an extending part 6 which is fixed upon one of the tubes of said framework and loosely fits over the tube 1 in order that it may swivel around it; it is provided with radial extensions 6$^a$. Upon the tube 1 is mounted a bracket 46 which is provided with extensions 47 and with the bar 49. Through this bar 49 takes a screw 48 the end of which, as said screw is screwed through said bar 49, presses against the radial extension 6$^a$ as shown by Fig. 9. It will thus be seen that when the tube 5 is in the position indicated by Figs. 2, 9 and 10$^a$, that is, when the side car is not folded the screw 48 prevents the part 6 and framework 5 from swiveling around the tube 1, while on said screw 48 being unscrewed, the parts 5, 6, and 6$^a$ are free to swivel and allow the raising of the side car into the position indicated by Figs. 4 and 5. The screw 48 is provided with a collar or cross pin or with a chain to prevent its detachment from the machine, the two former preventing same from being entirely unscrewed from the part 49, while the latter prevents it from becoming lost should it be entirely unscrewed from said part 49.

Instead of the wheel 32 being carried below the framework 5 as above described, we may arrange same to be mounted in hinged bearings 50, 51, Figs. 6 and 7, carried by the framework 5, the former being rigidly mounted upon said frame work and the latter being hinged at 52 to said part 50. The axle of the wheel 32 is carried by the hinged part 51, while the part 50 is preferably formed at its outer end 53 to partially inclose the outer end of the part 51. The bolt 33 is hinged to an appropriate fixed part of the side car's framework and an extension 54 of the part 51 carries a projection corresponding to that 36 over which takes the nut 35 thus said axle is mounted above the level of the framework 5.

Instead of the seat constructed as above described we may employ a seat similar to that shown in Figs. 13, 14, 15. In this case said seat 24 is provided with brackets 25 provided with two series of notches 28, 28ª, so that said seat may occupy the position indicated by Fig. 13, when the notch 28 takes over the projecting part 29, or said seat may be turned over into the position as shown in Fig. 14, where the user may sit in either direction as desired, or it may be completely folded as shown by Fig. 15, so as to occupy little useful space, the base piece 55 being hinged on a pin 56, by which means, if desired, said folded seat may be turned into an approximately vertical position should such vertical position be more convenient.

It will readily be understood that we may make use of any appropriate spring clips or the like mounted on the cycle's framework for firmly holding the side car in its folded position such clips not being illustrated as any ordinary construction may be followed.

We may employ a resilient hinge for the stay 39 in order that same may be folded without necessitating the unscrewing of its retaining bolt, thus when the side car and said stay are folded the car and motor bicycle will take up in width a space only slightly in excess of that occupied by the motor bicycle alone.

Such being the nature and object of our said invention what we claim is:—

1. In a foldable side car attachment for motorcycles, a chassis, a collapsible seat carried by said chassis, a hinged frame-work mounted on said chassis and carrying a collapsible hood, means for holding said hood in an open position, a hinge connecting said chassis and the framework of the motorcycle, said chassis, collapsible seat and collapsible hood being capable of movement against the framework of the motorcycle.

2. In a foldable side car attachment for motorcycles, a rod secured to the framework of the motorcycle, a chassis hinged to said rod and adapted to fold upwardly in close proximity to the motorcycle, a collapsible seat carried by said chassis and adapted to be folded down upon said chassis, and a wheel hinged to the outer frame of said chassis and adapted to be folded against the under side of said chassis when the latter is in folded position.

3. In a foldable side car attachment for motorcycles, a rod secured to the framework of the motorcycle, a chassis hinged to said rod, a collapsible seat carried by said chassis, a foldable hood hinged to said chassis, and a wheel hinged to the outer side of said chassis.

4. In a foldable side car attachment for motorcycles, a rod secured to the framework of the motorcycle, a chassis hinged to said rod and adapted to fold upwardly in close proximity to the motorcycle, a collapsible seat carried by said chassis and adapted to be folded down upon said chassis, a wheel hinged to the outer frame of said chassis and adapted to be folded against the under side of said chassis when the latter is in folded position, and means for locking said wheel in running position when said chassis is in unfolded position.

5. In a foldable side car attachment for motor cycles, a rod secured to the framework of the motorcycle, a chassis hinged to said rod and adapted to be folded upwardly in close proximity to the motorcycle, a collapsible seat carried by said chassis, a bearing hinged to the outer side of said chassis, a wheel journaled in said bearing and adapted to be folded against the underside of said chassis when the latter is in folded position, and means for locking said bearing in extended position to retain said wheel in running position when said chassis is in unfolded position.

6. In a foldable side car attachment for motorcycles, a rod secured to the framework of the motorcycle, a chassis hinged to said rod and adapted to swing upwardly in close proximity to said motorcycle, a cross bar carried by said chassis, seat carrying members hinged to said cross bar, a foldable seat carried by said members, means for locking said seat carrying members in extended position, a wheel hinged to the outer side of said chassis, and adapted to be folded against the underside thereof when the latter is in folded position, and means for locking said wheel in running position when said chassis is in unfolded position.

7. In a foldable side car attachment for motorcycles. a rod secured to the framework of the motorcycle, a chassis hinged to said rod and adapted to be swung upwardly in close proximity to the motorcycle, a cross bar carried by said chassis, seat carrying members hinged to said cross bar, a foldable seat carried by said members, said seat and members being adapted to fold downwardly upon said chassis, means for retaining said seat in unfolded position, means for locking said seat carrying members in extended position, a wheel hinged to the outer side of said chassis and adapted to be folded against the underside thereof when the latter is in folded position, and means for locking said wheel in running position when said chassis is in unfolded position.

8. In a foldable side car attachment for motorcycles, a rod secured to the frame of the motorcycle, a chassis hinged to said rod and adapted to be swung upwardly in close proximity to the motorcycle, a cross bar carried by said chassis, seat supporting members hinged to said crossbar, a seat pivotally connected to said members, said seat and members being adapted to fold down upon said chassis, means for locking said members in upright position, locking means between said seat and members for retaining said seat in extended position, a wheel hinged to the outer side of said chassis and adapted to be folded against the underside of said chassis when the latter is in folded position, and means for locking said wheel in running position when said chassis is in unfolded position.

9. In a foldable side car attachment for motorcycles, a rod secured to the framework of the motorcycle, a chassis hinged to said rod, a crossbar carried by said chassis, seat supporting members hinged to said cross bar, means for locking said members in upright position, a collapsible seat carried by said members, means for locking said seat in extended position, hood carrying rods hinged to the forward end of said chassis, a collapsible hood secured to said rods, means for retaining said hood in extended position, a wheel hinged to the outer side of said chassis, and means for retaining said wheel in running position.

10. In a foldable side car attachment for motorcycles, a rod secured to the framework of the motorcycle, a chassis hinged to said rod, a cross bar carried by said chassis, seat supporting members hinged to said cross bar, means for locking said member in upright position, a collapsible seat carried by said member, means for locking said seat in extended position, hood carrying rods hinged to the forward end of said chassis, a collapsible hood secured to said rods, a bar pivoted to the rod carried by the motorcycle frame and detachably connected to one of said hood rods for retaining said hood in extended position, a wheel carried by the outer side of said chassis, and means for locking said wheel in running position.

11. In a foldable side car attachment for motorcycles, a rod carried by the framework of the motorcycle, a chassis hinged to said rod and adapted to swing upwardly in close proximity to the motorcycle, and a wheel hinged to the outer side of said chassis and adapted to be folded against the underside of said chassis when the latter is in folded position.

12. In a folding side car attachment for motorcycles, a rod carried by the framework of the motorcycle, a chassis hinged to said rod and adapted to be folded upwardly into close proximity with the motorcycle frame, means for locking said chassis in folded position, a wheel hinged to the outer side of said chassis and adapted to be folded downward against the underside of said chassis when the latter is in folded position.

13. In a folding side car attachment for motorcycles, a rod carried by the framework of the motorcycle, a chassis hinged to said rod and adapted to be folded upwardly against the frame of the motorcycle, a seat carried by said chassis and adapted to be folded downwardly upon the top thereof, a wheel hinged to the outer side of said chassis and adapted to be folded against the underside thereof when the latter is in folded position, and means for locking said chassis in unfolded position.

14. In a folding side car attachment for motorcycles, a chassis connected to the frame of the motorcycle and adapted to be folded upwardly thereagainst, and a wheel hinged to the outer side of said chassis and adapted to be folded against the under side thereof when the latter is in folded position, and means for locking said chassis in unfolded position.

15. In a folding side car attachment for motorcycles, a chassis connected to the frame of the motorcycle and adapted to be folded upwardly thereagainst, and a wheel hinged to the outer side of said chassis and adapted to be folded against the under side thereof when the latter is in folded position.

In testimony whereof we have signed our names to this specification in the presence of two subscribing witnesses.

ALFRED IRVING.
PERCY STOCKWELL RITHERDON.

Witnesses:
  JOHN WHITEHEAD,
  MALCOLM SMETHURST.

---

Copies of this patent may be obtained for five cents each, by addressing the "Commissioner of Patents, Washington, D. C."